US010530516B2

(12) United States Patent
Jiang

(10) Patent No.: US 10,530,516 B2
(45) Date of Patent: Jan. 7, 2020

(54) METHOD AND SYSTEM FOR CONTROLLING CHANNEL REPLACEMENT AND SPECTRAL OCCUPANCY

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/926,227

(22) Filed: Mar. 20, 2018

(65) Prior Publication Data

US 2019/0296851 A1    Sep. 26, 2019

(51) Int. Cl.
| | | |
|---|---|---|
| *H04J 14/02* | (2006.01) | |
| *H04B 10/079* | (2013.01) | |
| *H04B 10/60* | (2013.01) | |
| *H04B 10/50* | (2013.01) | |
| *H04B 10/40* | (2013.01) | |

(52) U.S. Cl.
CPC .... *H04J 14/0212* (2013.01); *H04B 10/07951* (2013.01); *H04B 10/07953* (2013.01); *H04J 14/0261* (2013.01); *H04B 10/40* (2013.01); *H04B 10/50* (2013.01); *H04B 10/60* (2013.01); *H04J 14/0284* (2013.01)

(58) Field of Classification Search
None
See application file for complete search history.

(56) References Cited

U.S. PATENT DOCUMENTS

| | | | | | |
|---|---|---|---|---|---|
| 5,088,095 | A | * | 2/1992 | Zirngibl | ............... H04B 10/296 372/25 |
| 6,356,386 | B1 | * | 3/2002 | Denkin | ............... H04B 10/291 359/337 |

(Continued)

FOREIGN PATENT DOCUMENTS

| | | |
|---|---|---|
| CN | 104836751 A | 8/2015 |
| CN | 106712839 A | 5/2017 |

(Continued)

OTHER PUBLICATIONS

H. C. Ji, K. J. Park, J. H. Lee, H. S. Chung, E. S. Son, K. H. Han, S. B. Jun, and Y. C. Chung; Optical performance monitoring techniques based on pilot tones for WDM network applications; Korea Advanced Institute of Science and Technology, Department of Electrical Engineering 373-1,Guseong-dong, Yuseong-gu, Daejeon 305-701, Korea; Received Dec. 1, 2003; Revised Mar. 18, 2004; Accepted Mar. 30, 2004; Published Jun. 14, 2004.

*Primary Examiner* — Darren E Wolf

(57) ABSTRACT

The present disclosure includes methods and systems in which idle tones are added at an ingress and terminated at an egress of a given fiberoptic communication link between ROADM nodes. An equalization process can be performed across the spectrum of available wavelength channels and then a determination can be made of a number of channels that can be added or dropped at a given time that meet a maximum threshold for change in power of the channels in the available wavelength. As channels without information-carrying signals are filled with idle tones, the stability of the optical system can be improved as there is less variability in power change when all of the channels have a substantially similar nominal power and a signal on one or more of those channels are added or removed.

26 Claims, 13 Drawing Sheets

(56) References Cited

U.S. PATENT DOCUMENTS

| | | | | |
|---|---|---|---|---|
| 6,563,614 B1* | 5/2003 | Stephens | ............ | H04B 10/0775 |
| | | | | 398/136 |
| 9,831,978 B1 | 11/2017 | Mehrvar | | |
| 2002/0048062 A1* | 4/2002 | Sakamoto | .......... | H04B 10/0775 |
| | | | | 398/30 |
| 2007/0286551 A1* | 12/2007 | Shahar | .................... | G02F 2/004 |
| | | | | 385/45 |

FOREIGN PATENT DOCUMENTS

| | | |
|---|---|---|
| WO | 2005102014 A2 | 11/2005 |
| WO | 2018040282 A1 | 3/2018 |

\* cited by examiner

METHOD AND SYSTEM FOR CONTROLLING CHANNEL REPLACEMENT AND SPECTRAL OCCUPANCY

FIELD OF THE APPLICATION

The application relates generally to optical communication network devices and in particular, embodiments to optimizing channel addition and removal in optical networks.

BACKGROUND

Optical networks are employed to support the demand for high-speed, high-capacity advanced telecommunications and data networks. These optical networks commonly utilize optical dense wavelength division multiplexing (DWDM) to exploit the available optical spectrum. In optical DWDM, data is modulated onto several different carrier waves of different wavelengths. The modulated carriers are commonly referred to as wavelength channels. The optical frequency slots in which the wavelength channels propagate are termed wavelength channel slots.

Many optical networks employ optical nodes that correspond to branch points of the optical network. Often, these nodes employ Reconfigurable Optical Add Drop Multiplexer (ROADM) devices that allow for the removal or addition of one or more channel wavelength slots at a node. Optical networks also include optical amplifiers between the ROADM devices to amplify the signal during transmission. A common example of an optical amplifier is an Erbium Doped Fiber Amplifier (EDFA).

In DWDM systems, adding and deleting signals on wavelength channel slots causes power changes to other wavelength channels, due to transient and steady state amplification effects of the EDFAs, and fiber Stimulated Raman Scattering (SRS) effect. In order to limit power changes related to these transient and steady state behaviors, the number of signals on channels to be added or deleted, or both, at a given time is typically kept small and channel power optimization may be used. Limiting the number of signals on channels that can be added or removed at a given time and performing channel power optimization can result in the channel slot add/delete process being slow.

SUMMARY

Aspects of the present disclosure include, in a fiberoptic transmission link, ensuring all channels of a system bandwidth or spectrum are occupied with a nominal power signal. Therefore, for channels that do not have an information-carrying signal, an idle tone of a nominal power is added for transmission on the fiberoptic transmission link. Once the channels are filled, equalization can be performed for a condition of all channels being filled. Adding or dropping of signals on channel slots is achieved by replacing idle tones with information-carrying signals or vice-versa.

A benefit of maintaining all the channels of a system spectrum in a link with a nominal power may be that signals on channels can be added or dropped with a reduced disturbance to the signals on channels not being replaced. Another benefit may be an increased speed for adding and removing signals on channels. In some embodiments, it may be considered that using adding or removing signals on channels in a DWDM systems becomes almost "digital" in nature in that channels can be turned "on" or "off" without the need to adjust or equalize the power of some or all of the channels.

In a first aspect of the application, there is provided a method for operating an optical multiplexed section (OMS) of a fiberoptic transmission link. The method involves propagating in the OMS a plurality of information-carrying signals each in a respective wavelength channel slot of the fiberoptic transmission link, wherein a number of the information-carrying signals is less than or equal to a total number of wavelength channel slots in the fiberoptic transmission link and propagating in the OMS a plurality of idle tones in remaining wavelength channel slots not occupied by the information-carrying signals.

In some embodiments, the method further comprises replacing a first signal on a wavelength channel slot with a second signal on the wavelength channel slot.

In some embodiments, replacing a first signal with a second signal involves one of removing one of the information-carrying signals from the OMS and adding an idle tone in a wavelength channel slot of the information-carrying signal removed from the OMS; removing one of the idle tones from the OMS and adding another idle tone in a wavelength channel slot of the idle tone removed from the OMS; and removing one of the idle tones from the OMS and adding an information-carrying signal in a wavelength channel slot of the idle tone removed from the OMS.

In some embodiments, an optical power level of the second signal is substantially equal to an optical power level of the first signal before the removal.

In some embodiments, the method further involves generating the plurality of idle tones from amplified spontaneous emission (ASE) of an optical gain medium.

In some embodiments, the method further involves performing power equalization for all wavelength channel slots on the OMS section including the information-carrying signal wavelength channel slots and the wavelength channel slots carrying an idle tone.

In some embodiments, the method further involves collecting link information pertaining to the OMS and other OMS in an optical network of which the OMS and the other OMS are a part.

In some embodiments, the link information includes one or more of: link topology, span loss, optical amplifier gain for each of the at least one optical amplifier, noise figure, channel power, bit error rate (PER), polarization dependent loss (PDL), polarization mode dispersion (PMD), a filtering effect of a wavelength selective switch (WSS) in the OMS, and back-to-back performance of transponder.

In some embodiments, when replacing the first signal, the method further involves determining an estimate of a performance margin for each wavelength channel; determining an allowed gain offset; determining a maximum number of wavelength channel slots of the at least one wavelength channel slot that can be replaced simultaneously based on at least one of the estimated performance margin, the allowed gain offset and a predetermined gain change mapping defining the gain for each wavelength channel slot when one or more wavelength channel slots are removed; and for each wavelength channel slot of the determined maximum number of wavelength channel slots that can be replaced, replacing the first signal on the wavelength channel slot with the second signal.

In some embodiments, when the maximum number of wavelength channel slots that can be replaced simultaneously is more than one, replacing less than the maximum number of wavelength channel slots at a given time.

In some embodiments, for a replacement of multiple sub-carriers supporting multiple wavelength channel slots, replacing the multiple sub-carriers involves: replacing all of the multiple sub-carriers together simultaneously; or replacing the sub-carriers in two or more sets of one or more sub-carriers.

In some embodiments, an optical path in a network includes multiple consecutive OMS sections, the method involving performing for multiple OMS sections: determining an estimate of a gain change for wavelength channel slots other than the wavelength channel slots being replaced if the wavelength channel slots being replaced were to be removed; determining a maximum number of wavelength channel slots of the at least one wavelength channel slot that can be replaced simultaneously; and for each of the determined maximum number of wavelength channel slots that can be replaced, replacing the first signal on the wavelength channel slot with the second signal.

In some embodiments, the method further involves using idle tones on wavelength channel slots for insertion loss calibration.

In some embodiments, using the idle tones on the wavelength channel slots for insertion loss calibration involves: allowing the idle tones on the wavelength channel slots to pass through to a second OMS; performing power equalization on the wavelength channel slots having the pass through idle tones; recording at least one of insertion loss and optical attenuation settings for the wavelength channel slots having the equalized pass through idle tones.

In a second aspect of the application, there is provided an apparatus that includes: a wavelength-selective switch (WSS) for receiving a plurality of information-carrying signals each in a respective wavelength channel slot of a fiberoptic transmission link, wherein a number of the information-carrying signals is less than or equal to a total number of wavelength channel slots in the fiberoptic transmission link, and for coupling the plurality of information-carrying signals to an optical multiplexed section (OMS); and a light source coupled to the WSS to provide a plurality of idle tones in remaining wavelength channel slots not occupied by the information-carrying signals; wherein the WSS is configured to couple the plurality of idle tones to the OMS.

In some embodiments, the WSS is configured to replace a first signal on a wavelength channel slot with a second signal on the wavelength channel slot.

In some embodiments, replacing the first signal with the second signal involves one of: removing one of the information-carrying signals from the OMS and adding an idle tone in a wavelength channel slot of the information-carrying signal removed from the OMS; removing one of the idle tones from the OMS and adding another idle tone in a wavelength channel slot of the idle tone removed from the OMS; and removing one of the idle tones from the OMS and adding an information-carrying signal in a wavelength channel slot of the idle tone removed from the OMS.

In some embodiments, the WSS includes variable optical attenuators configured to adjust an optical power level of the first signal and the second signal.

In some embodiments, the apparatus is further configured to perform power equalization for all wavelength channel slots on the OMS section including the wavelength channel slots bearing the plurality of information-carrying signals and the wavelength channel slots carrying the plurality of idle tones.

In a third aspect of the application, there is provided an apparatus that includes: a communication interface configured to communicate with at least one optical network node that is configured to add or drop an optical signal on a wavelength channel slot, the at least one optical network node being part of at least one optical multiplexed section (OMS) of a fiberoptic transmission link; a processor; and a computer readable medium for storing processor executable instructions. The computer processor executable instructions, when executed by the processor, control propagation in the OMS of a plurality of information-carrying signals each in a respective wavelength channel slot of the fiberoptic transmission link, wherein a number of the information-carrying signals is less than or equal to a total number of wavelength channel slots in the fiberoptic transmission link; and control propagation in the OMS of a plurality of idle tones in remaining wavelength channel slots not occupied by the information-carrying signals.

In some embodiments, the computer readable medium has further stored thereon processor executable instructions, that when executed by the processor: collect link information pertaining to the OMS and other OMS in an optical network of which the OMS and the other OMS are a part thereof.

In some embodiments, the link information includes one or more of: link topology, span loss, optical amplifier gain for each of the at least one optical amplifier, noise figure, channel power, bit error rate (BER), polarization dependent loss (PDL), polarization mode dispersion (PMD), a filtering effect of a wavelength selective switch (WSS) in the OMS, and back-to-back performance of transponder.

In some embodiments, the computer readable medium has further stored thereon processor executable instructions, that when executed by the processor: send control information over the communication interface to replace a first signal on a wavelength channel slot with a second signal on the wavelength channel slot.

In some embodiments, the computer readable medium has further stored thereon processor executable instructions, that when executed by the processor: determine an estimate of a performance margin for each wavelength channel; determine an allowed gain offset; determine a maximum number of wavelength channel slots of the at least one wavelength channel slot that can be replaced simultaneously based on at least one of the estimated performance margin, the allowed gain offset and a predetermined gain change mapping defining the gain for each wavelength channel slot when one or more wavelength channel slots are removed for each wavelength channel slot of the determined maximum number of wavelength channel slots that can be replaced, send an indication to replace the first signal on the wavelength channel slot with the second signal.

In some embodiments, determining the maximum number of wavelength channel slots that can be replaced simultaneously comprises determining the number of wavelength channel slots that can be replaced simultaneously such that the gain change for each of the wavelength channel slots other than the wavelength channel slots being replaced is less than a predetermined threshold.

In some embodiments, the computer readable medium has further stored thereon processor executable instructions, that when executed by the processor: allow an idle tone on at least one wavelength channel slot to pass through to a second OMS; perform power equalization on wavelength channel slots having the pass through idle tones and information-carrying signals; and record at least one of insertion loss and optical attenuation settings for the at least one wavelength channel slot having the equalized pass through idler tone.

In some embodiments, the computer readable medium has further stored thereon processor executable instructions, that when executed by the processor and when the pass through idle tone is removed from the wavelength channel slot and replaced with a different signal: send control information over the communication interface to adjust power of the channel from which the pass through tone was removed based on at least one of the recorded insertion loss and optical attenuation settings.

BRIEF DESCRIPTION OF THE DRAWINGS

Embodiments will now be described with reference to the attached drawings in which

FIGS. 7A, 71B, 7C and 7D are graphs illustrating additional examples of channel loading dependent gain;

DETAILED DESCRIPTION OF EMBODIMENTS

Figure 1:
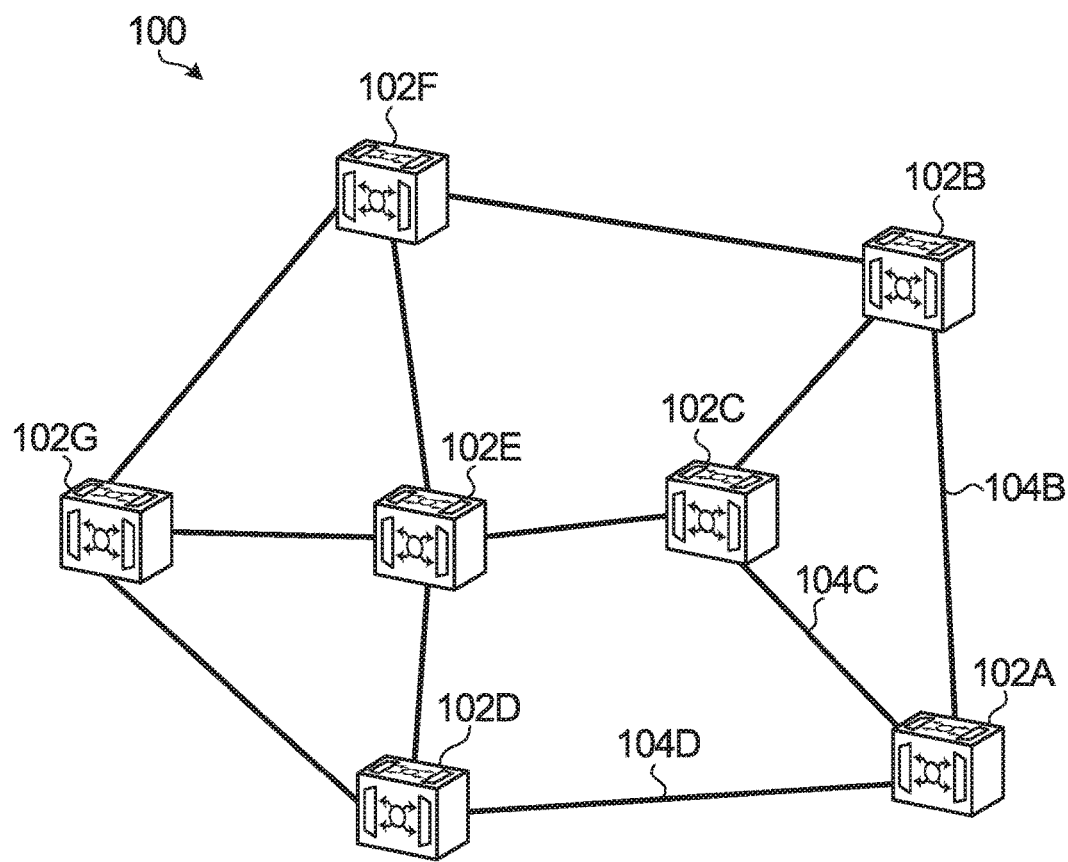
FIG. 1 is a block diagram of an optical network in which embodiments of the present disclosure may be implemented.

A DWDM optical network supports a plurality of wavelength-multiplexed optical channels with central wavelengths $\lambda_i$, i=1, . . . , N. These optical channels are typically spaced uniformly in frequency and lie on a predefined grid, for example corresponding to ITU-T 50 GHz, 100 GHz or 200 GHz frequency spacing. In this context, wavelength channels will be referred to according to the channel central wavelengths $\lambda_i$. It is also noted that the number N of wavelength channels in the network may be implementation specific, with typical examples being in the range of 40 to 96. However, it will be appreciated that a uniform frequency spacing of wavelengths channels is not a requirement for the present disclosure. For example, embodiments are contemplated that support flex-grid compatibility, where at least one of channel bandwidths and spacings may be one or both of non-uniform and adaptable.

In an optical communication system having fiber based optical amplifiers, the rapid change in gain that occurs when a signal is removed or added to a channel slot can result in two particular effects that result in power changes to channels of the system spectrum. A typical example of a fiber based optical amplifier is an EDFA. The first effect is considered a transient effect, which is related to EDFA control speed and power change rate. This first effect can be controlled in part by adjusting the change add/deleted speed. The second effect is considered to be a static effect due to channel loading change that is caused in part due to gain coupling. The gain coupling can result in power offsets in channels of the spectrum that are not being added or removed. When there are multiple empty channels in a system spectrum, and some of those empty channels change from empty to a nominal power, or from the nominal power to an empty channel, this large change in power can have varying effects on the power of the other channels in the system spectrum. The term "empty" is intended to mean there is no information-carrying signal on the channel. It is to be understood that there is some minimum noise on any given channel. Therefore, channel loading can be said to have a variable effect on channel power.

There are dynamic factors and static factors that affect changes in power due to channel loading. A dynamic factor is EDFA transient due to the gain coupling mentioned above. Static factors may include gain coupling due to gain ripple and spectral hole burning (SHB). SHB causes fast gain changes to the output of an EDFA due to changes in the spectral occupancy. When the spectral occupancy of the section changes (due to the addition or deletion of signal on a wavelength channel), SHB causes unwanted changes in gain to one or more wavelength channels of a system spectrum. SHB is caused by different inversions of the erbium ions, which have complex but similar emission and absorption spectra that are shifted in wavelength with respect to each other.

Some aspects of the present disclosure provide systems and methods to mitigate negative effects of adding and removing signals on channels for system spectra that include one or more empty channels. The system and methods disclosed herein may mitigate the negative effects by filling all wavelength channel slots in a fiberoptic transmission link of an optical network that do not bear information-carrying signals with idle tones. The fiberoptic transmission link is optimized and operated under a condition of all wavelength channel slots being filled. The optical power at idle tone wavelength(s) are added at the beginning of the fiberoptic transmission link and terminated at the end of the fiberoptic transmission link. Power equalization is performed for all of the wavelength channels, including the channels bearing information-carrying signal and the idle tone channels. Signal on channels are added or dropped by replacing the idle tones with information-carrying signals or vice-versa. While the term "optical power at idle tone wavelength(s)" is used above, it should be appreciated that equivalent terms "idle tone wavelength channels", "idle tone channels", "idle tones", "idlers", "idler channels" or "dummy channels" may also be used.

FIG. 1 is a block diagram of an example optical network 100 in which embodiments of the present disclosure may be implemented. The optical network 100 includes seven access ROADM nodes 102A, 102B, 1020, 102D, 102E, 102F and 102G that are interconnected via optical communication links as shown in FIG. 1. For example, Access ROADM node 102A is interconnected with access ROADM nodes 102B, 102C and 102D via optical communication links 104B, 104C and 104D, respectively. Because access ROADM node 102A is interconnected with three other access ROADM nodes (access ROADM nodes 102B, 102C and 102D), it may be referred to as a three-degree access ROADM node.

The optical communication links between the access ROADM nodes 102A, 102B, 102C, 102D, 102E, 102F and 102G may be optical fiber communication links, for example.

Figure 2:
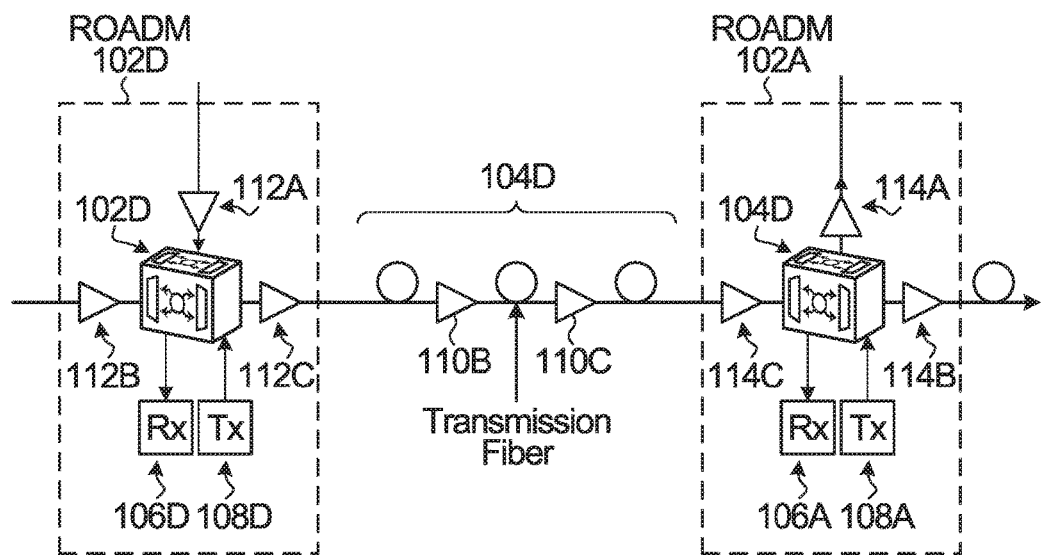
FIG. 2 is a block diagram of an optical link in an optical network in which embodiments of the present disclosure may be implemented.

FIG. 2 is a more detailed view of an optical link between two ROADM nodes. FIG. 2 shows two ROADM nodes 102A and 102D and link 1040 between the two ROADM nodes. Optical link 104D is shown to include two fiber based optical amplifiers 110A and 110B with optical fiber sections between the optical amplifiers and between ROADM node 102D and optical amplifier 110A and ROADM node 102A and optical amplifier 110B. The ROADM 102D is shown to include three optical amplifiers 112A, 112B and 112C. The ROADM 102A is shown to include three fiber based optical amplifiers 114A, 114B and 114C. The optical amplifiers may be used at the input port (s) and output port (s) of the ROADM nodes to amplify optical signals received at an input port or transmitted from an output port. Such amplifiers may be used to compensate for at least a portion of the losses that may be incurred as an optical signal propagates through the network. Such losses may include those induced by transmission fiber or the WSS itself, for example. Each of the ROADM nodes 102D and 102A also include a respective receiver (RX) 106D and 106A as well as a respective transmitter (TX) 108D and 108A, for use in adding and dropping channels. A more detailed view of an ROADM node will be shown in FIG. 3.

In the present application an optical link between Optical Add Drop Multiplexers (OADMs) may be referred to as an optical multiplexing section (OMS). The number of optical channels that can traverse an OMS is 0 to some maximum number. Non-limiting examples may include 80 channels, 88 channels or 96 channels. Information carrying signals can be added to wavelength channels locally at an ROADM or be routed from other OMS. Information carrying signals can be dropped locally at an ROADM or be routed to other OMS. An information carrying signal on a wavelength channel can transverse many OMS. It is also to be understood that a number of wavelength channels or a number of information carrying signals, or both, can change in an OMS over time.

Figure 3:
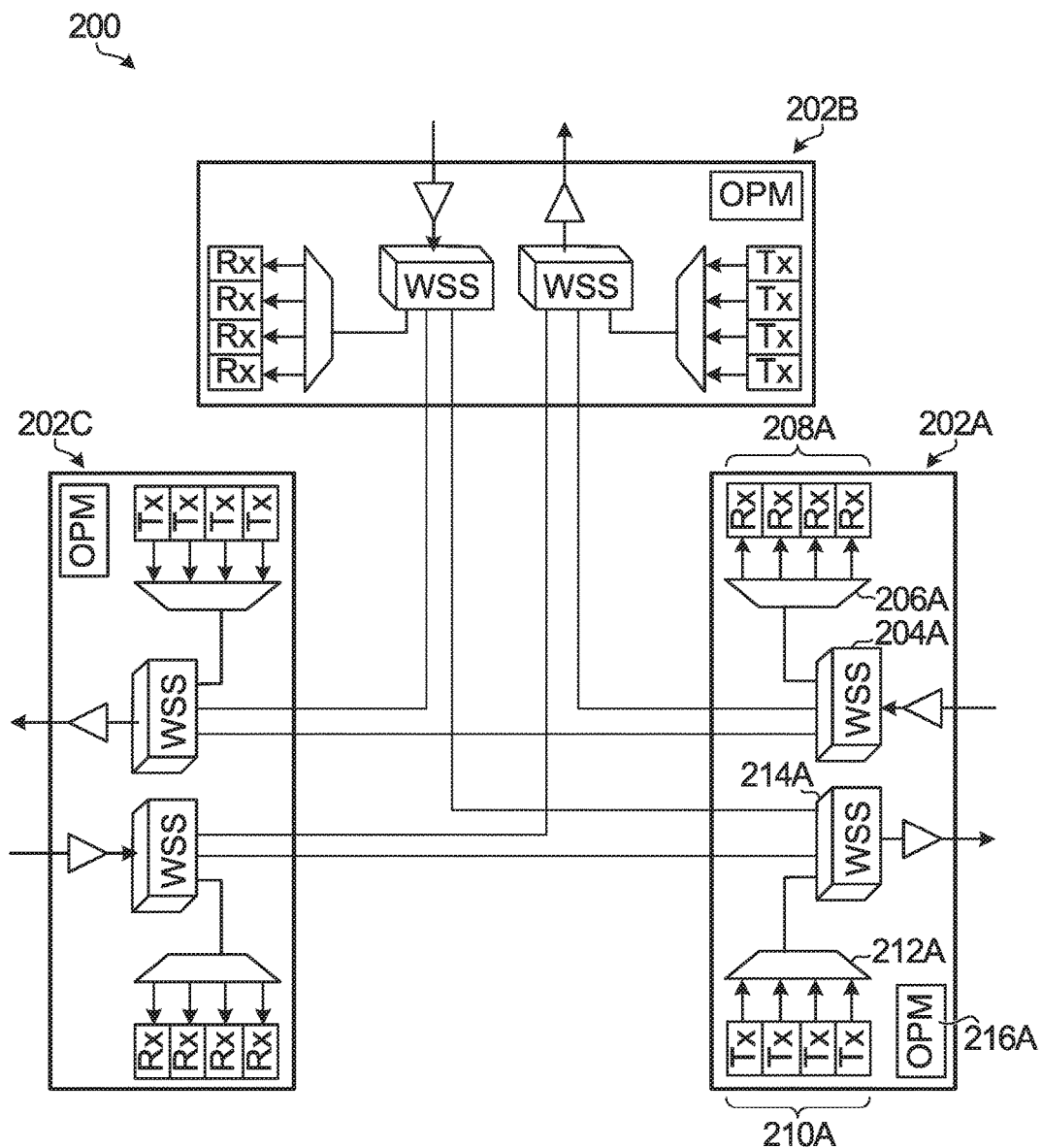
FIG. 3 is a block diagram of a three-degree ROADM node architecture in which embodiments of the present disclosure may be implemented.

FIG. 3 is a block diagram of a three-degree ROADM node architecture 200. The number preceding "degree" indicates how many links the ROADM is connected to. The ROADM utilizes three WSS based elements 202A, 202B and 202C, which enable selectively adding and dropping wavelengths onto and from three optical transmission links to communicate with three neighboring network nodes. The node architecture 200 may be used to implement the three-degree access ROADM node 102A shown in FIG. 1 or 2, for example. It is to be understood that for a n-degree ROADM node there could be up to n WSS based elements.

The ROADM element 202A includes a WSS 204A used for dropping one or more wavelength channels of a received signal, also known as a Route WSS, a drop demultiplexer 206A, a plurality of local receivers 208A, a plurality of local transmitters 210A, an add multiplexer 212A, a WSS 214A for adding one or more wavelength channels, also known as a Select WSS, optical amplifiers 220A and 222B and an optical performance monitoring (OPM) device 216A. The ROADM elements 202B and 202C are the same as ROADM element 202A. These components are optically interconnected as shown in FIG. 3 so that traffic coming from any of the three directions can be directed to any of the other directions via an optical communication path from the Route WSS to the Select WSS, or traffic can be directed to the local receivers for the inbound direction via an optical communication path from the Route WSS of the inbound direction to the demultiplexer of the inbound direction. Traffic from the local transmitters for an outbound direction can be directed to any of the three directions via an optical communication path from the multiplexer of the outbound direction to the WSS of the outbound direction.

The OPM devices are used for optical performance monitoring at various monitoring points within the node, such as at one or both of the input port(s), the output port(s), and at outputs of the EDFAs of the respective WSS, for example.

As will be appreciated, operating a ROADM node architecture 200 such as that illustrated in FIG. 3 generally involves configuring and controlling its constituent WSS devices, which includes controlling the configuration and adaptation of wavelength paths through the WSS device.

It is noted that the ROADM node architecture 200 shown in FIG. 3 is merely one example of a WSS based ROADM node architecture that may be used to realize a ROADM node. Other architectures (which may include variations of the illustrated architecture) are possible and are contemplated within the context of the present disclosure. For example, the Select WSS 214A may be replaced with a less complex optical splitter.

It is noted that the Select WSSs shown in FIG. 3 are all 3×1 WSSs, in that they are configured to selectively switch wavelength channels from their three optical switching input ports to their single optical switching output port. It should be understood that an architecture intended to support more (or fewer) degrees of freedom may employ different WSSs. With regard to the Route WSSs, the configuration includes one optical switching input port and multiple optical switching output ports, a 1λ3 switch, where the WSS is configured to selectively switch wavelength channels from the single optical switching input port to one of its multiple optical switching output ports.

It is also noted that in FIG. 3, the ROADMs do not include any type of light source to provide idle tones to wavelength channels that do not have information signals. Examples of ROADMs having such a light source will be described below with reference to FIG. 4.

The present disclosure includes methods and systems in which idle tones are added at an ingress and terminated at an egress of a given fiberoptic communication link between ROADM nodes. An equalization process can be performed across the spectrum of available wavelength channels and then a determination can be made of a number of channels that can be added or dropped at a given time that meet a maximum threshold for change in power of the channels in the available wavelength. As channels without information-carrying signals are filled with idle tones, the stability of the optical system can be improved as there is less variability in power change when all of the channels have a substantially similar nominal power and a signal on one or more of those channels are added or removed.

Figure 4:
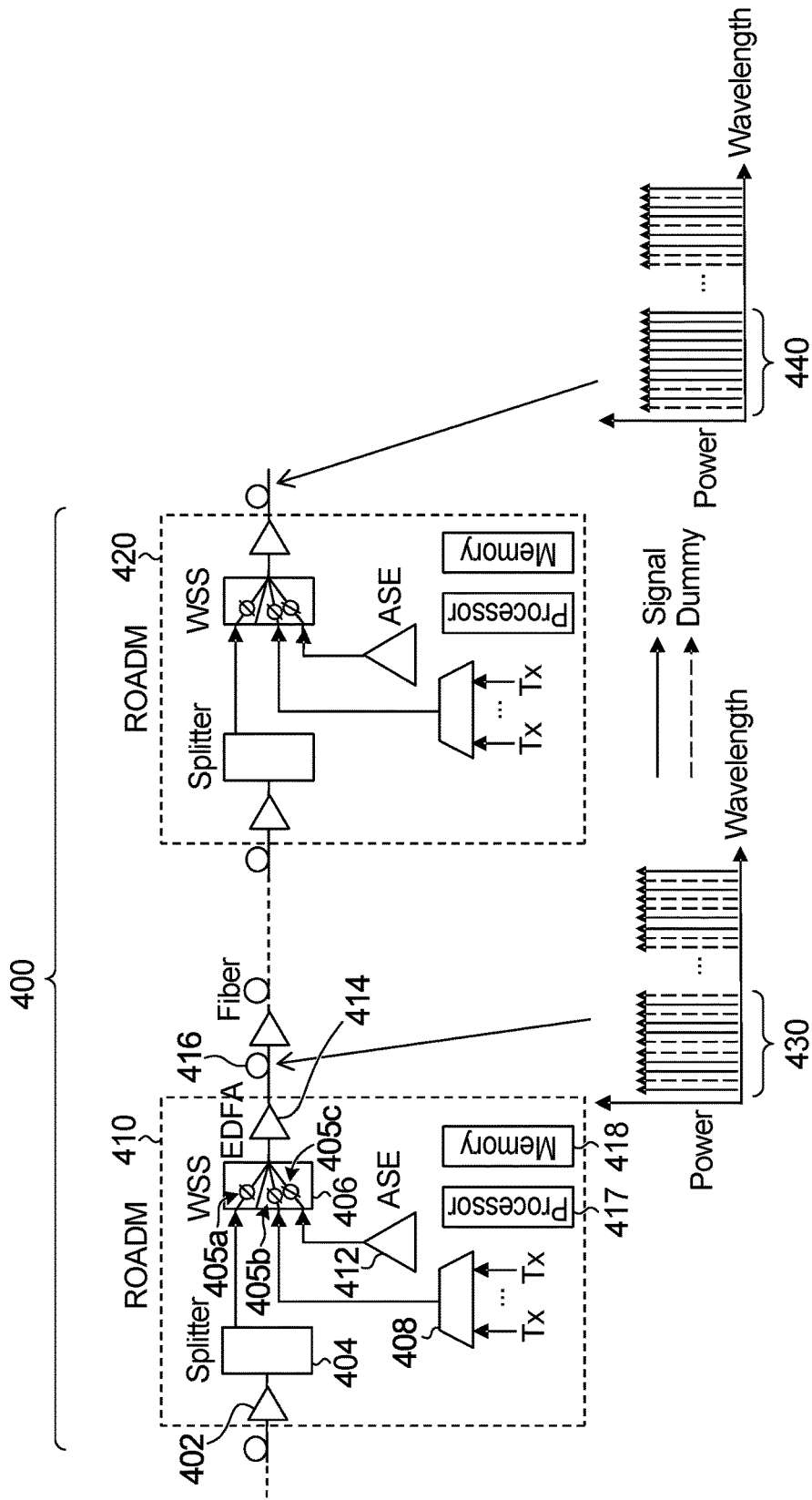
FIG. 4 is a block diagram of an optical link that could be controlled according, to an aspect of the present disclosure.

FIG. 4 is a block diagram that illustrates an example of a fiberoptic communication link 400 with an ROADM 410, 420 at each end of the optical link 400. In the example of FIG. 4 each of the ROADMs has a similar physical structure, but it is to be understood that the ROADM nodes could have different architecture as longs at the node are capable of implementing the functionality described herein. Referring to ROADM 410, subsequent to an input port, there is a first optical amplifier 402 that is coupled to a splitter 404. The splitter 404 is coupled to an input port of a wavelength selective switch (WSS) 406. An optical multiplexer 408 configured to receive optical signals from one or more transmitters (Tx) is coupled to another input port of the WSS 406. Also coupled to an input port of the WSS 406 is an amplified spontaneous emission (ASE) source 412 that is used to add idle tones to designated channels. Other inputs of the WSS 406 may be from additional splitters receiving signals from other OMS that are not shown. One or more paths from the inputs of the WSS 406 to the output of the WSS 406 may include variable optical attenuators 405a, 405b and 4405c to attenuate the power of optical signals on those paths. An output port of the WSS 406 is coupled to a second optical amplifier 414. An output port of the ROADM 410 is coupled to a fiber segment and one or more optical amplifiers, one of which is shown 416. The ROADM 410 is further shown to include a processor and memory for storage of data and instructions that when executed by the processor enable the ROADM to perform methods as described herein, such as for example methods described with regard to FIGS. 9, 10 and 12.

With regard to ASE source 412, while EDFA generated ASE is a convenient source for idlers, other approaches are also possible such as a laser array.

A spectral output of each of the ROADMs is also shown in FIG. 4 wherein the horizontal axis is representative of wavelength and the vertical axis is representative of power. Information-carrying signals are shown as solid vertical lines and idle tones are shown as dashed vertical lines. Looking at a first portion 430 of the spectral output of ROADM 410 shows that channels 1, 3, 4, 7, 8 and 10 include information-carrying signals and channels 2, 5, 6, 9 and 11 include idle tones. The idle tones are added to respective channel slots using the ASE 412 to WSS 406. Those same idle tones are removed at ROADM 420 and new idle tones, or information-carrying signals, are added to those channel slots. Looking at a first portion 440 of the spectral output of ROADM 420 shows that channels 2 and 4 to 11 include information-carrying signals and channels 1 and 3 include idle tones. This means that when idle tones on channels 2, 5, 6, 9 and 11 are removed at ROADM 420, they are all replaced with information-carrying signals on those channels. Channels 1 and 3 that carried information-carrying signals, are dropped at ROADM 420 and replaced with idle tones.

A single ASE source can be used in a ROADM to add idle tones for multiple egress paths of the ROADM.

A benefit of maintaining all of the channels with a substantially nominal power may be that the speed of adding and removing channels can be increased without introducing disturbance to other channels not being added or removed at that instance. In some embodiments, it may be considered that using DWDM systems become almost "digital" in nature in that channels can be turned on or off without the need to adjust or equalize the power of some or all of the channels. In some embodiments, use of such a full channel nominal power condition may result in an improved optical signal to noise ratio (OSNR) for the signals on the various channels.

FIGS. 5, 6 and 7A to 7D illustrate various examples of how channel loading affects channel gain within an example multi-channel spectrum.

Figure 5:
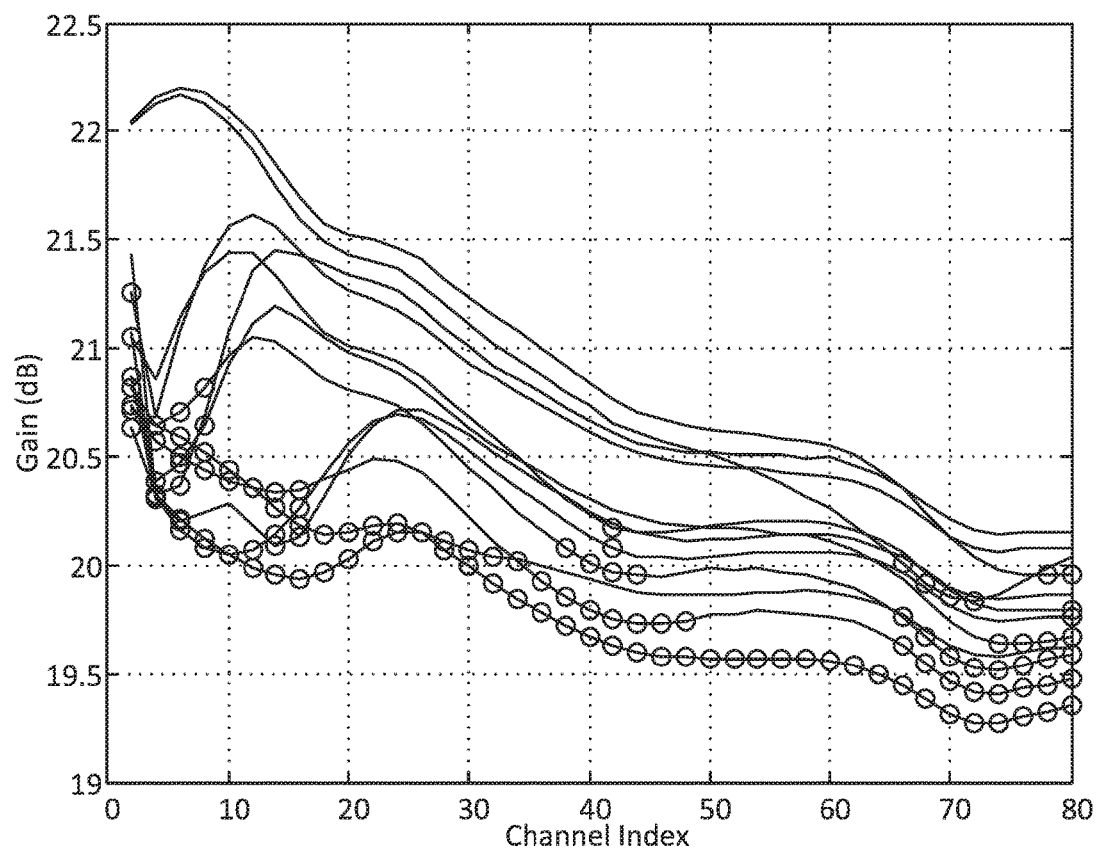
FIG. 5 is a graph illustrating a first example of channel loading dependent gain.

FIG. 5 is a graph with multiple plots illustrating examples of channel loading dependent gain for a singe EDFA for different channel loading scenarios. Each plot of the graph represents a different channel loading scenario. The horizontal axis of the graph denotes the channel index of a spectrum having 80 channels. The vertical axis of the graph denotes the gain at each channel of the spectrum. The channels that have nominal power signals for each respective measurement are shown as red circles. It can be seen how adding channels in different portions of the overall spectrum affect the gain locally around that channel, or set of channels, and at other portions of the spectrum.

Figure 6:
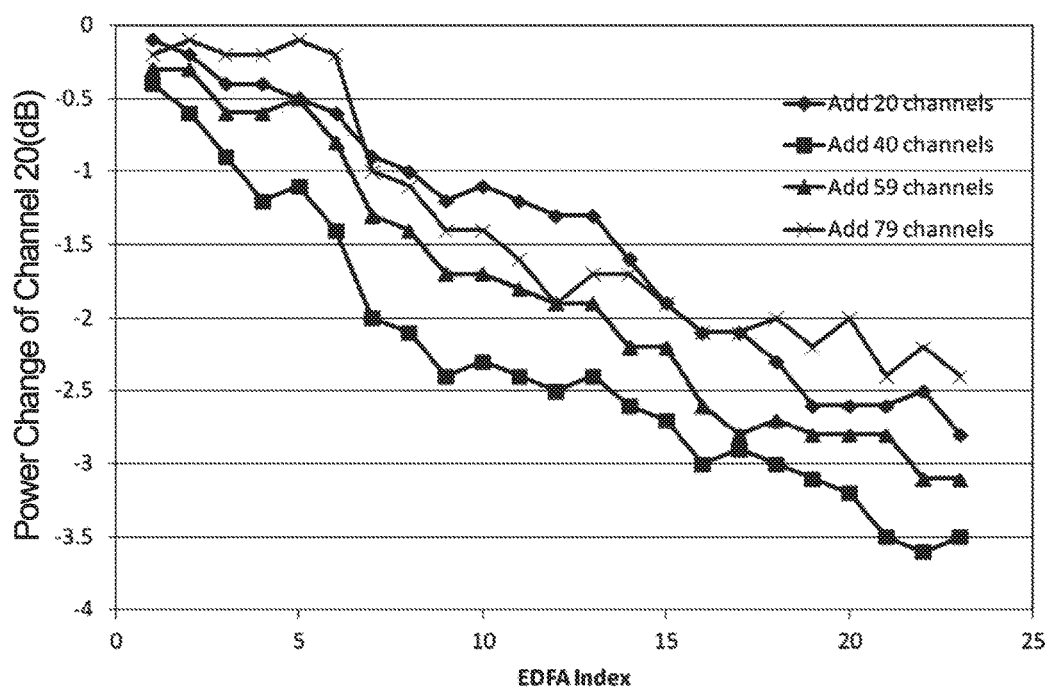
FIG. 6 is a graph illustrating a second example of channel loading dependent gain.

FIG. 5 illustrates the channel loading dependent gain for the case of a single EDFA. In a fiberoptic link having multiple EDFA, the gain change can accumulate substantially coherently. FIG. 6 is a graph with multiple plots illustrating examples of channel loading dependent gain at a single channel (in this case channel 20) subsequent to various EDFA in an OMS. Each plot is descriptive of a particular scenario of a different set of channels having nominal power being added to the system spectrum. The horizontal axis of the plot denotes the EDFA index of an (DMA having 23 EDFA. The vertical axis of the plot denotes the power change at channel 20 of the system spectrum. For each plot of a different number of channels being added, the change of the gain at channel 20 over the 23 EDFA can be seen to be a substantially linear relationship.

FIGS. 7A, 7B, 7C and 7D are graphs illustrating examples of how channels having an existing signal are affected by the addition of signals on other channels. In each of the graphs the horizontal axis denotes the channel index of the system spectrum having 80 channels and the vertical axis denotes the power of the channel. Each graph shows the nominal power of one or more channels and an overlaid plot of the power of those same one or more channels and newly added channels. The overlaid plot illustrates the load dependent change in the power of the original one or more channels when additional signals on other channels are added.

Figure 7A:
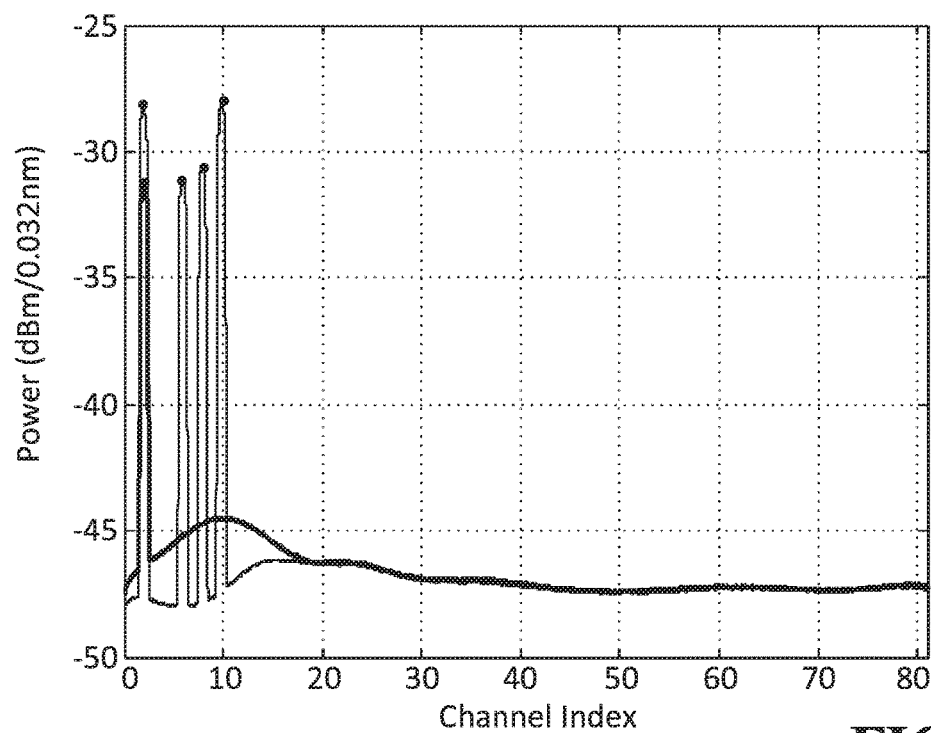
Figure 7B:
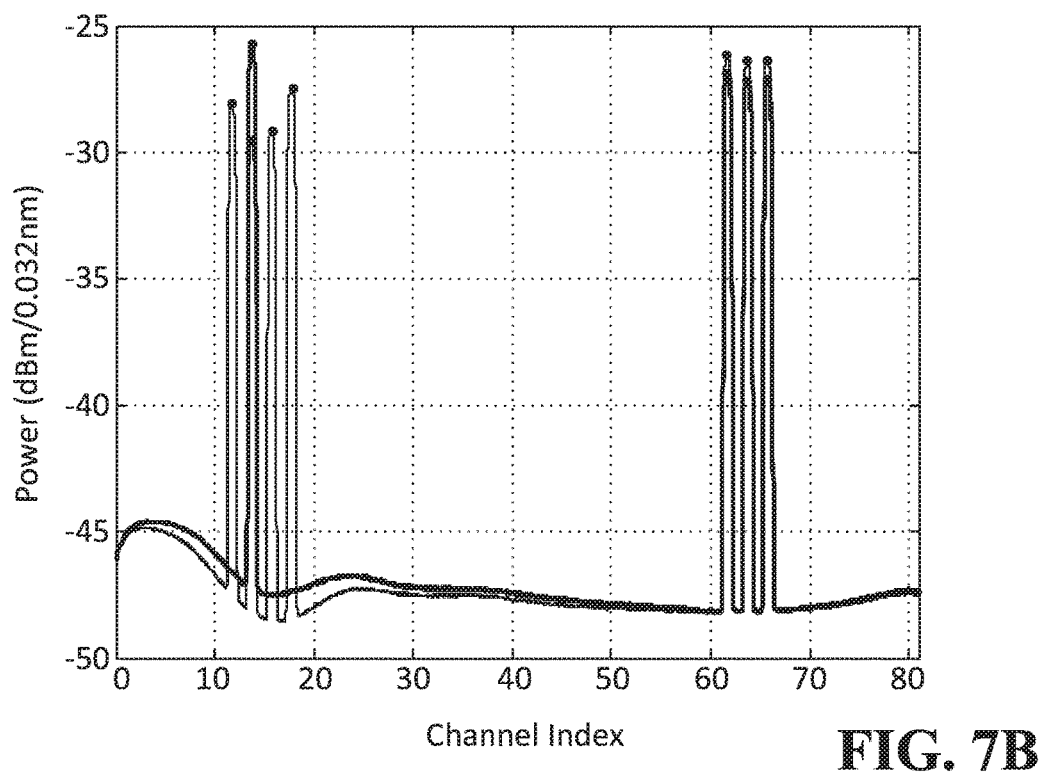
Figure 7C:
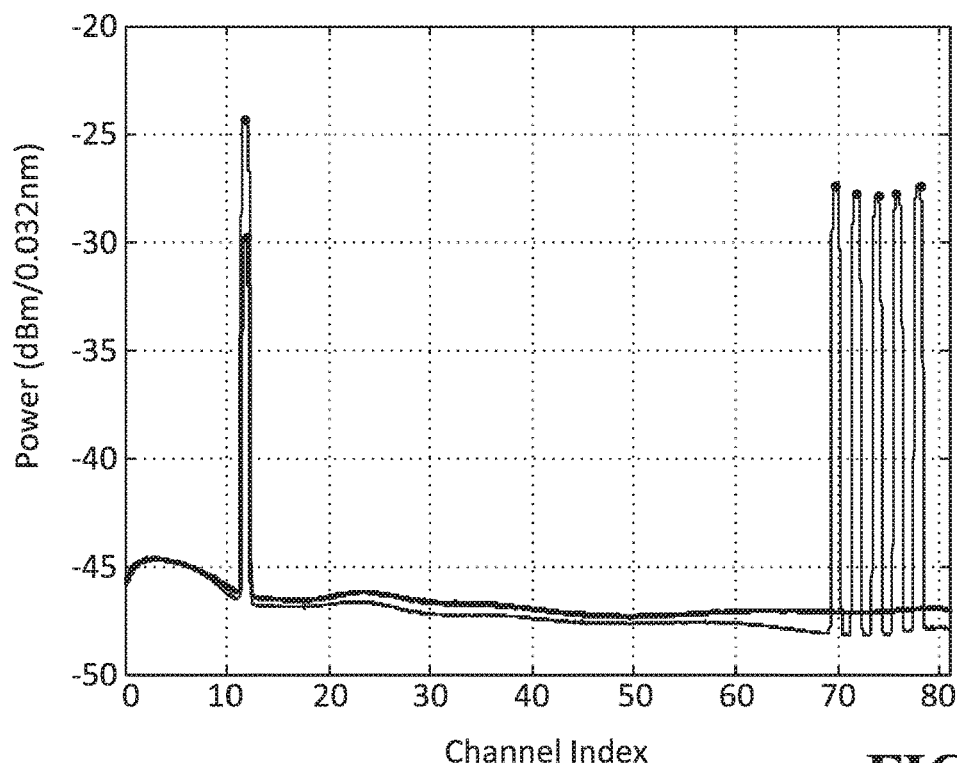
Figure 7D:
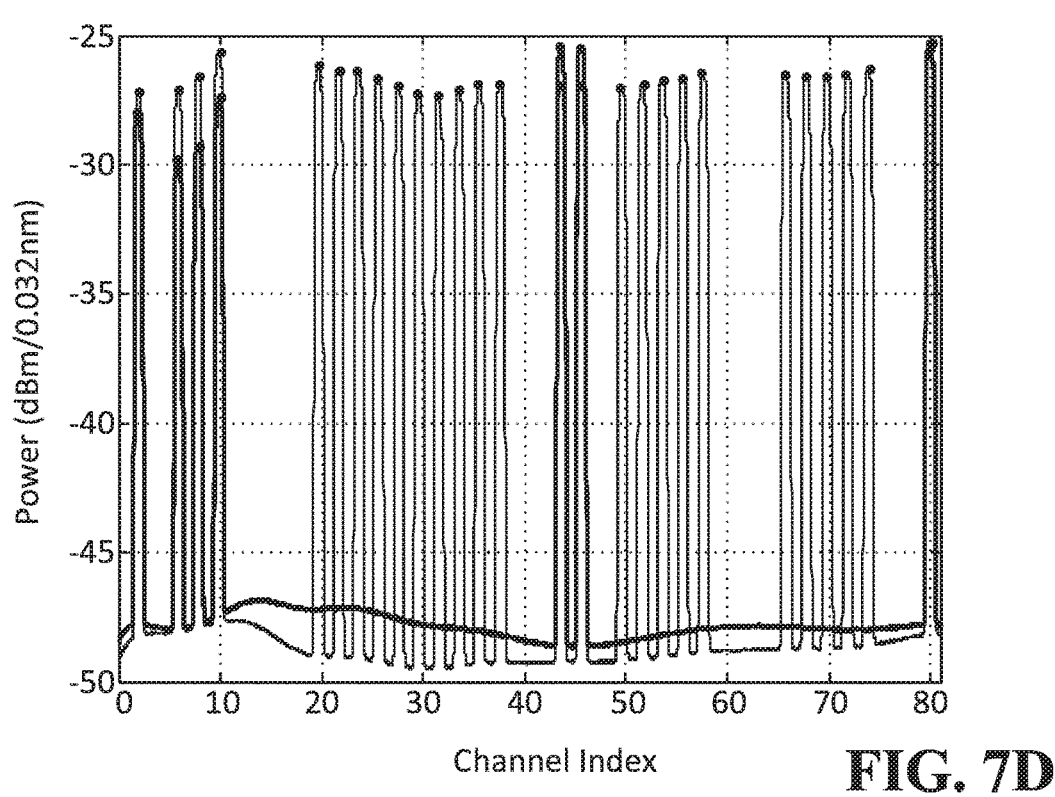

FIG. 7A illustrates how the power of existing channel 2 changes from −32 dBm to −23 dBm when nominal power signals are added to channels 6, 3 and 10. FIG. 7B illustrates how the power of existing channels 14, 62, 64 and 66 are affected when nominal power signals are added to channels 12, 16 and 18. FIG. 7C illustrates how the power of channel 12 is affected when nominal power signals are added to channels 70, 72, 74, 76 and 78. FIG. 7D illustrates how the power of channels 2, 6, 8, 10, 44, 46 and 80 are affected when nominal power signals are added to channels 20, 22, 24, 26, 28, 30, 32, 34, 36, 38, 50, 52, 54, 56, 58, 66, 68, 70, 72, 74 and 78. Note that the absolute power levels in FIGS. 7A, 7B 7C and 7D are not significant themselves, because only a small portion of power is tapped and monitored. The actual power in the channel is significantly higher.

In order to limit the amount of channel dependent power change in channels that are not being added or dropped during the channel add/drop process, one or more of the following actions can be performed:

limiting the number of channels to be added/dropped at a given instance;

performing power optimization after each add/drop instance;

performing the operation sequentially in multiple OMS links; and budgeting a sufficiently large operating margin.

While these measures improve safety of the channel add/remove process, they make the add/drop process operation time take longer. Performing some of the above functions may also be difficult to perform in a mesh network, in particular performing the add-drop operation in a sequential manner for multiple OMS links.

Automatically switched optical networks (ASCII) are a key area of development for future optical communication networks. In order to take full advantage of ASON, channel re-routing must be as seamless as possible. Currently, the process of routing can still take minutes per channel. Reducing that time will advance the possibility of ASON, and would also aid in the operation of non-ASON systems.

As part of the equalization process for a given OMS, the power change for each channel is affected by other channels being added or dropped. The per channel power change can be used to determine a maximum number of channels that can be added or dropped at a given instance. The power change per channel for different instances of channels being added/dropped can be captured in a gain offset map. For a multiple channel system, the gain offset map can be used substantially as a lookup table of gain offset values during the equalization process. The gain offset map can be determined based on a difference between the gain spectrum when ail input channels exist and have a substantially same nominal input power and a gain spectrum when the input power of the ith channel of the multiple channels is 0 and all other channels have the substantially same nominal input power. In a most basic and simple scenario, this determination is made for ail channels, when the input power of each respective channel is considered to be 0. For example, the power of each channel when only the first channel has an input power equal to 0, the power of each channel when only the second channel has an input power equal to 0, the power of each channel when only the third channel has an input power equal to 0, on so on up to the last channel. Gain offset maps can be determined for increasingly complex scenarios such as for the addition of sets of two or more contiguous channels or sets of two or more non-contiguous channels. The gain offset map can be determined once and then stored in a memory and accessed from the memory when performing equalization as described below. A network element that performs the equalization may not determine the gain offset map itself, but may be provided the gain offset map and store it for later use.

Figure 8:
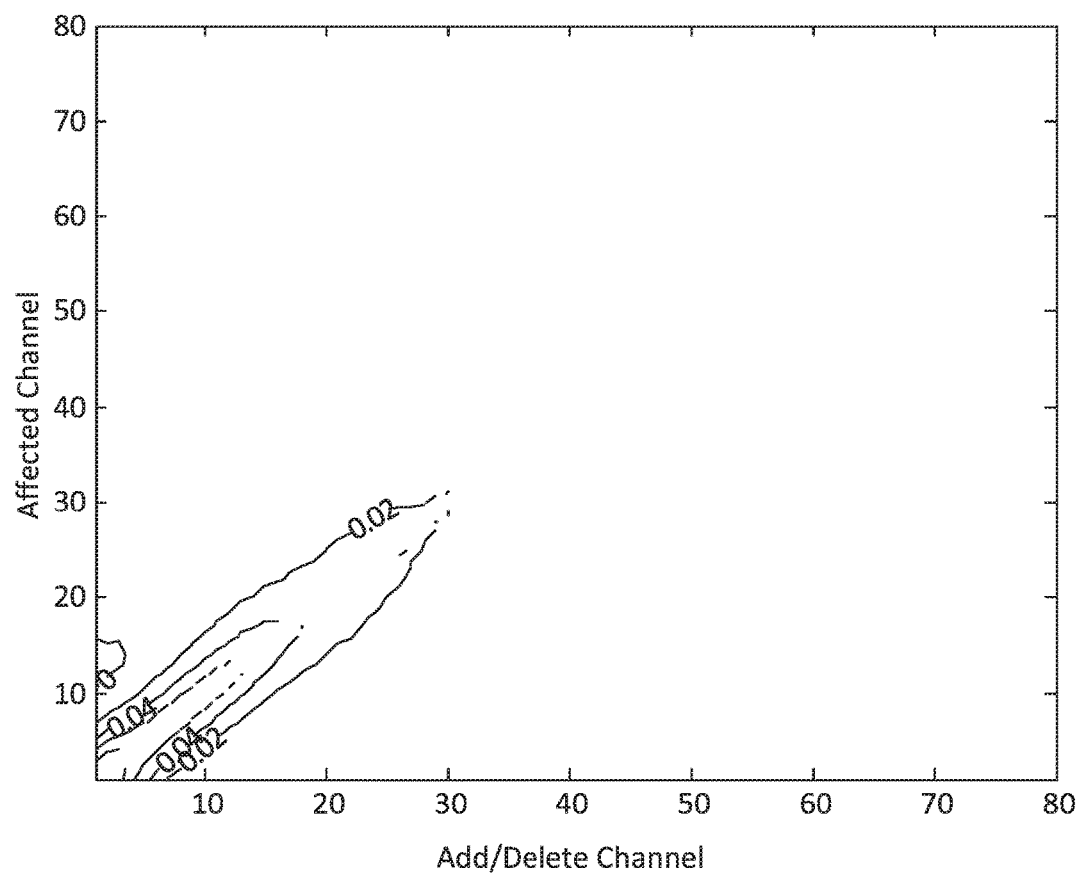
FIG. 8 is an example contour plot defining channel dependent gain of an erbium doped fiber amplifier (EDFA) in the form of a gain offset map that may be generated and used according to an aspect of the present disclosure.

FIG. 8 is a contour plot defining a gain offset map for when only a single input channel, of an 80 channel spectrum, is set equal to 0 and the other 79 channels are set to a nominal power level, for each respective channel at a time. The horizontal axis of the plot denotes the channel index of a channel that is being set to 0. The vertical axis of the plot denotes a channel index of an affected channel. FIG. 8 shows the gain change is mostly very small (<0.02 dB), except at the bottom left corner where the gain change can be up to +0.1 dB per amplifier. The increase in the bottom left corner is a result of the SHB effect occurring at approximately 1535 nm.

While FIG. 8 is a contour map plot for an 80 channel spectrum, it is to be understood that a similar representation could be generated for any number of channels. Also, while the contour map illustrates a continuous line defining a particular value of loss. The continuous line is an artificial line connecting a number of discrete points representative of a same power at a given channel index. It is these discrete values that could be stored in a look-up table.

The following paragraphs describe examples of how an information-carrying signal may be added, in replacement of an idle tone, or dropped and replaced with an idle tone.

Adding an information-carrying signal on a channel that carried an idle tone in a previous OMS is achieved by replacing the idle tone with the information-carrying signal. For example, referring back to FIG. 4, the ASE source 412 is coupled to port 1 of WSS 406 and the local Txs are coupled to port 2 WSS 406 via optical multiplexer 408. To add an ith channel from a local Tx, and assuming that the ith channel is currently an idle tone, the WSS 406 is configured, for the ith channel, to change the WSS cross-connection from port 1 to port 2.

Dropping an information-carrying signal from a channel that does not have a replacement information-carrying signal being added at the ROAD is achieved by replacing the information-carrying signal from the channel with an idle tone. For example, again referring back to FIG. 4, the ASE source 412 is coupled to port 1 of WSS 406 and the local Txs are coupled to port 2 WSS 406 via optical multiplexer 408. To drop an ith channel, and assuming that the ith channel is currently an information-carrying signal channel, the WSS 406 is configured, for the ith channel, to change the WSS cross-connection from port 2 to port 1.

Channel re-routing is essentially the combination of adding a channel and dropping a channel, or vice versa.

Figure 9:
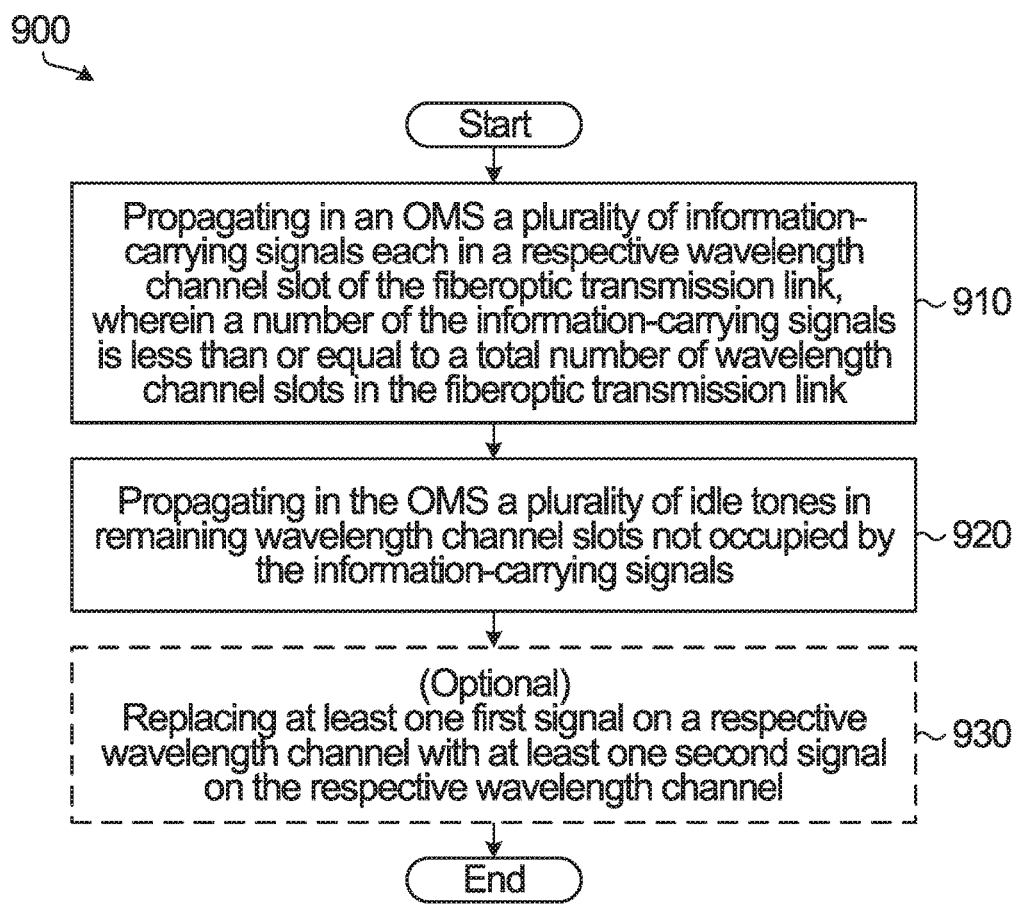
FIG. 9 is a flow chart describing an example method in an apparatus according to example embodiments described herein.

A description of a method for operating an optical multiplexed section (OMS) of a fiberoptic transmission link according to an aspect of the disclosure is provided below with reference to flow chart 900 in FIG. 9. The steps in FIG. 9 occur in at least one network element at an end of a fiberoptic transmission link.

Step 910 involves propagating in the OMS a plurality of information carrying signals each in a respective wavelength channel slot of the fiberoptic transmission link, wherein a number of the information-carrying signals is less than or equal to a total number of wavelength channel slots in the fiberoptic transmission link. Step 920 involves propagating in the OMS a plurality of idle tones in remaining wavelength channel slots not occupied by the information-carrying signals. The plurality of idle tones may be generated from amplified spontaneous emission (ASE) of an optical gain medium.

A further step 930, which may be considered to be optional, involves replacing ac least one first signal on a respective wavelength channel slot with at least one second signal on the respective wavelength channel slot. Replacing the at least one first signal with the at least one second signal may include any one of: removing at least one information-carrying signal from the OMS and adding at least one idle tone in a respective wavelength channel slot of the information-carrying signal removed from the OMS; removing at least one idle tone from the OMS and adding at least one other idle tone in a respective wavelength channel slot of the idle tone removed from the OMS; and removing at least one idle tone from the OMS and adding at least one information-carrying signal in a respective wavelength channel slot of the at least one idle tone removed from the OMS. When the first signal is replaced by the second signal, the optical power level of the second signal is set substantially equal to an optical power level of the first signal before the removal.

A more detailed description of a method for determining a number of channels that can be added a given instance according to an aspect of the disclosure is provided below with reference to flow chart 1000 in FIG. 10.

Figure 10:
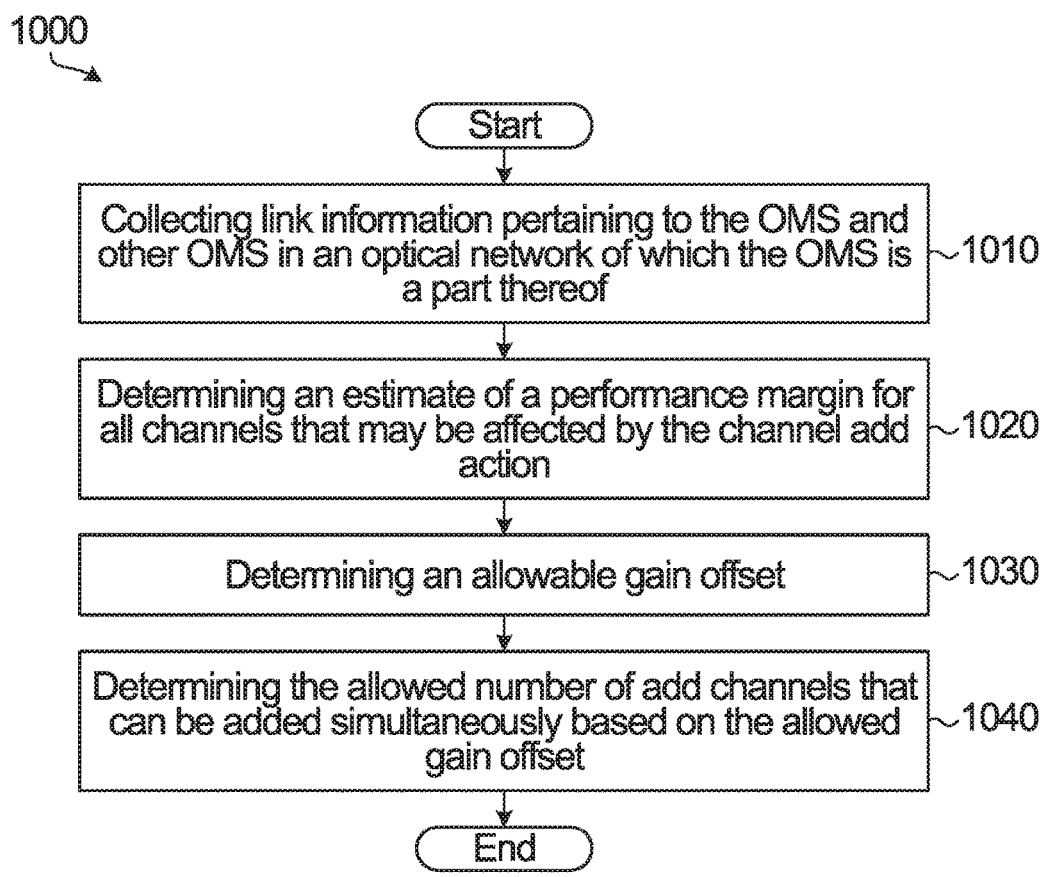
FIG. 10 is a flow chart describing another example method in an apparatus according to example embodiments described herein.

In some embodiments, a network element performing at least some of the steps of FIG. 10 is an element that is located within the network and which performs the steps for multiple fiberoptic transmission links. The network element can communicate with the ROADM nodes that form the fiberoptic transmission links and provide control information to control the adding and dropping of channels. The network element may be co-located with one of the ROADMs that the network element operates upon, or it may not be co-located with any of the ROADM, but simply be located somewhere within the network. The network elements may be referred to as a Performance Calculation Engine (PCE).

In a first step 1010, information regarding one or more fiberoptic transmission links in the network is collected. Information regarding the fiberoptic transmission links may include, but is not limited to link topology, operating conditions such as span loss, EDFA gain, noise figure, channel power, bit error rate (BER), polarization dependent loss (PDL), polarization mode dispersion (PMD), filtering effect of the WSS, and back-to-back performance of a transponder. The information about the links enables the signal performance of the link to be assessed. The one or more fiberoptic transmission links includes the multiple OMS. For instance, a PCE that is responsible for controlling the adding and dropping of channels of multiple OMS according to aspects of the present disclosure may collect information for multiple fiberoptic transmission links. The information may be collected when the network is set up, as new fiberoptic transmission links are added to the network and any time it is determined that some or all of the information should be updated.

In step 1020, an estimate is determined of a performance margin for all channels that may be affected by the channel add action. The performance margin of a given channel may be, in some embodiments, based on the optical signal to noise ratio of the given channel. In some embodiments, the performance margin may be determined on a per channel basis and those per channel basis margins used as such. In some embodiments, the performance margin may be determined on a per channel basis, and a minimum margin value may be used for all channels that is based on the channel with the smallest determined performance margin. In some embodiments, the performance margin may be determined on a per channel basis, and an average margin value may be used for all channels that is based on an average determined performance margin for all of the channels.

A next step 1030 involves determining an allowed gain offset. If there is more than one channel to be added, multiple channels can be added simultaneously if the expected gain offset does not exceed the estimated performance margin, as will be described in further detail below. Impairment models based on OSNR and fiber nonlinear interference may be used to calculate the allowed positive or negative gain offset per optical amplifier for each channel.

Another step 1040 involves determining the allowed number of add channels that can be added simultaneously. A gain offset map, as described above, can be used to determine the maximum number of channels that can be added without exceeding the previously estimate performance margin.

One channel can be replaced at a time, but it may be more efficient to replace multiple channels simultaneously.

When replacing multiple channels simultaneously, the channel may still be replaced sequentially to reduce disturbance within the system.

When a channel (or a small number of channels) is temporally dropped during channel replacement, the gain or power change on all other channels can be determined based upon the gain offset map. Therefore, the impact on performance (OSNR and fiber nonlinear interference) and the OSNR margin can be determined. If the OSNR margin is larger than the power change expected during the channel replacement, then the channel can be replaced.

Figure 11:
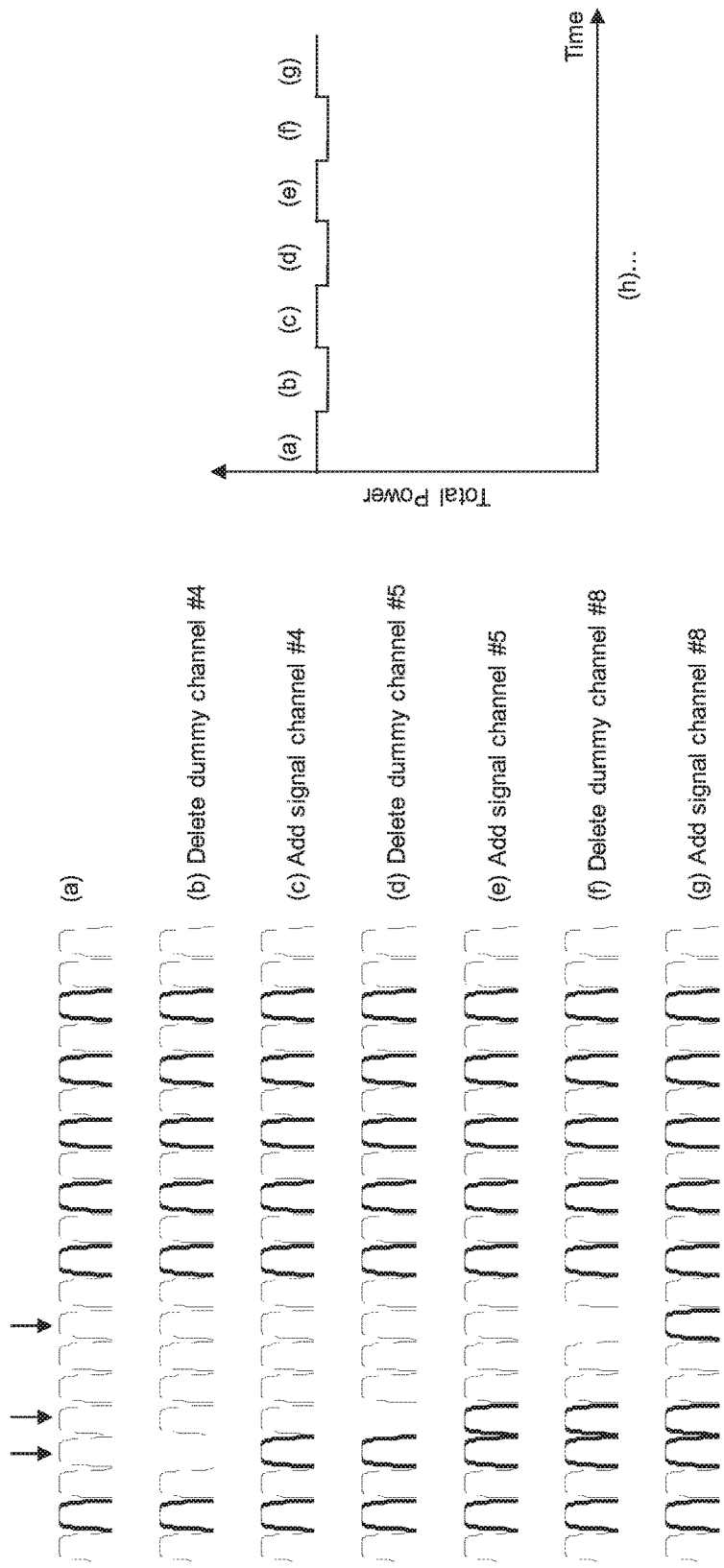
FIG. 11 is a collection of spectrum plots of a system spectrum in which signals on channels are being added and removed and a corresponding timing diagram illustrating how the power changes when the signals are added and removed.

FIG. 11 illustrates multiple stages of adding and removing signals from a spectrum of 20 channels. An initial state is shown in (a) where channels 1, 3 to 9, 11, 13, 15, 17, 19 and 20 include idle tones (dashed vertical lines) and channels 2, 10, 12, 14, 16 and 18 include information-carrying signal channels (solid vertical lines). Information-carrying signals are to be added to channels 4, 5 and 8 and therefore the idle tones on those channels need to be removed before the information-carrying channel is added. In (b), the idle tone on channel 4 is removed. In (c), the information-carrying signal is added to channel 4. In (d), the idle tone on channel 5 is removed. In (e), the information-carrying signal is added to channel 5. In (f), the idle tone on channel 8 is removed. In (g), the information-carrying signal is added to channel 8. A plot of total power variation over the course of adding and removing signals on the various channels is illustrated in (h). The horizontal axis denotes time and the vertical axis denotes the variation in the total power. It can be seen how the power varies over time as signals are added or deleted from particular channels.

It should be noted that since idle tones are added at the beginning of each OMS and terminated at the end of each GMS, an induced power excursion to existing channels is confined to the OMS.

In some embodiments, multiple sub-channels are considered to be a super-channel. Each sub-channel may, correspond to a respective sub-carrier. The multiple sub-channels may be a set of consecutive sub-channels or a set of sub-channels, some consecutive and others not, within the super-channel. In some Instances, all of the sub-channels of the super-channel are replaced simultaneously. In other instances, if the disturbance in the power of other channels induced by replacing the whole super-channel is more than desirable, then smaller portions of the super-channel are replaced at a given time. This may be one sub-channel at a time or two or more sub-channels at a time.

In some embodiments, the equalization process may be considered as at least two separate processes. A first process involves equalization being performed for the entire OMS for all channels in the system spectrum. The equalization process ensures that when there are multiple optical amplifiers in the OMS the amplification all of the channels is substantially maintained without significant distortion. Once this OMS equalization is performed the optimized power for each channel can be recorded. A second process involves maintaining the equalization for a given channel when replacing a signal on a channel. When a signal on a channel is dropped and a new signal added, be that an idle tone is replaced with an information-carrying signal, or vice versa, the ROADM that is responsible for replacing the channel can adjust the channel power of the channel based on the recorded optimized power from the first process. The first equalization process is typically performed much less frequently than the second process. The first process may be performed on a periodic basis or at any time the network deems it appropriate to update the OMS equalization.

It is to be understood that different OMS may have different signal idle tones as routing of information-carrying signals results in the adding and dropping of channels are different ROADMs along an optical path.

In a particular example, an optical path includes two OMS, a first OMS being between a first and a second ROADM and a second OMS being between the second ROADM and a third ROADM. As indicated above, idle tones are added to channels at the first ROADM of an OMS and terminated at the second ROADM of the OMS. Therefore, even if an idle tone is to be used over two consecutive OMS, the idle tone is still terminated at the end of the first OMS and a new idle tone is added to the second OMS.

When it is determined that the idle tone is to be replaced by an information-carrying signal on that channel over multiple consecutive OMS in order to route the information-carrying signal, the idle tone at both the first ROADM and the second ROADM need to be replaced. At the first ROADM of the first OMS, instead of adding the idle tone to the channel, the cross connection of the WSS is configured to add the information-carrying signal. At the second ROADM of the first OMS, the information-carrying signal does not need to be dropped, but the cross connection of the WSS in the second ROADM is reconfigured to route the information-carrying signal in the second OMS instead of adding a new idle tone to the channel, which was previously the case when the channel carried an idle tone.

When it is determined that the idle tone is to be changed to carry the information-carrying signal over the two OMS, in some embodiments the first and second ROADMs may reconfigure the respective WSS in parallel with one another or substantially simultaneously. In a scenario when multiple channels are to be replaced, they can be replaced simultaneously or one or more at a time. When two or more channels are being replaced at a given time in the two ROADMs, the replacement of particular channels does not necessarily need to be synchronized with one another, i.e. such that the same channel is replaced at the exact same time.

The channel power is set for each channel individually by applying an appropriate channel loss so that the channel power is based on the replaced idle tone power or a known offset.

Channel power equalization may be performed locally at the first ROADM for the first OMS during or after the replacement. After all channels are replaced, channel power equalization may be done for the entire OMS for refinement.

While power adjustment of the channels can be performed based on optical performance measurement (OPM) feedback, this type of feedback process can be inherently longer than a process that does not include this type of feedback.

A further aspect of present disclosure is that insertion loss for network elements, such as ROADMs, can be dynamically calibrated. This may result in reducing the need to perform channel power equalization.

Another aspect of the present disclosure includes an insertion loss calibration process that can be performed online. The insertion loss calibration process is a feedback free adjustment that involves using measuring the power of idle tones to determine insertion losses of an OMS and once the insertion losses are determined, adjusting the optical power on that channel taking into consideration the insertion loss to maintain a nominal power level for that channel. This process could be performed for some or all of the channels of the system spectrum as information-carrying signals are replaced with idle tones. Such a feedback free adjustment process may improve speed of the routing process.

Figure 12:
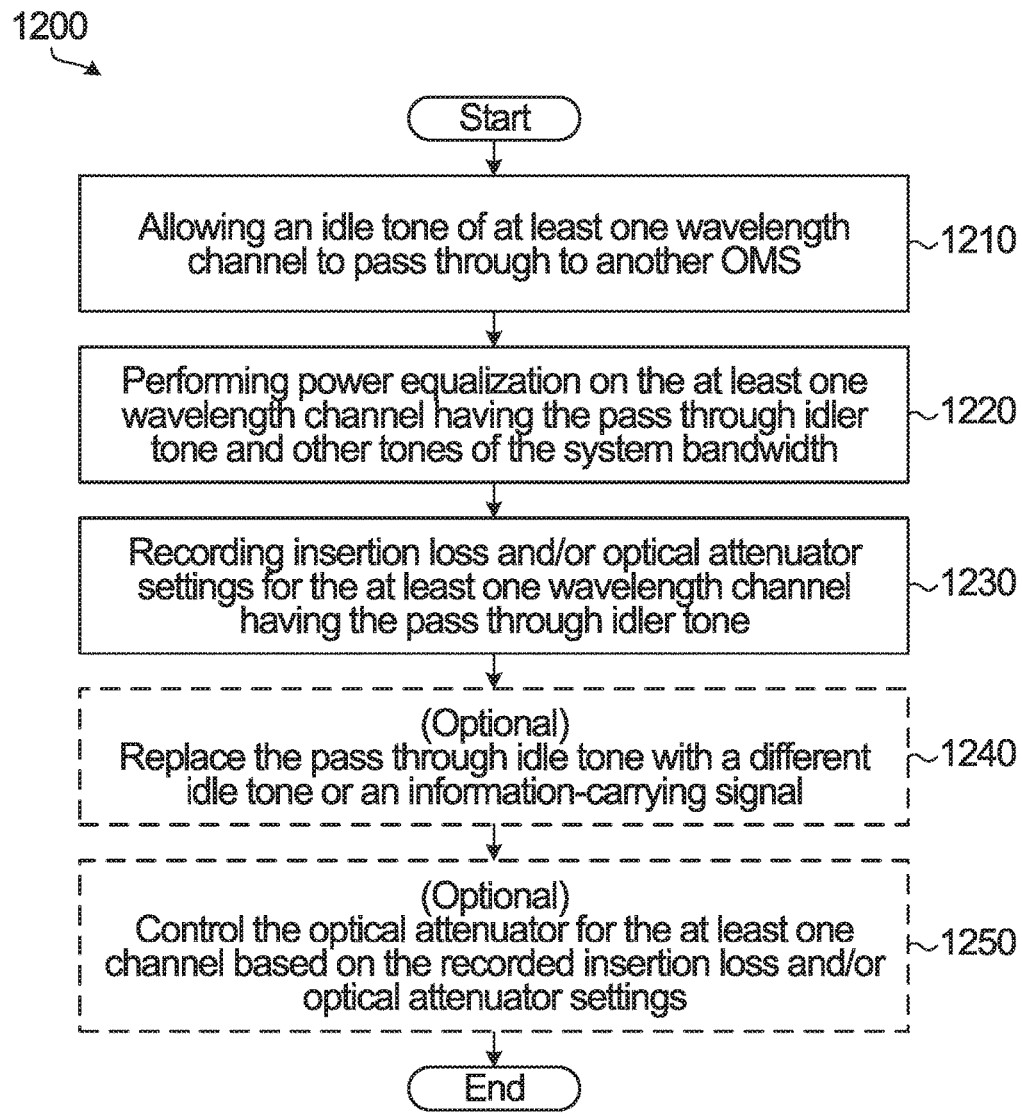
FIG. 12 is a flow diagram of an example operation in an apparatus according to embodiments described herein.

A detailed description of an insertion loss calibration method according to an aspect of the disclosure is provided below with reference to flow chart 1200 in FIG. 12. As described above, light on idle tones is typically terminated by a network element at the end of an OMS. However, in step 1210, the idle tone is not terminated by the network element at the end of a first OMS, but is allowed to pass from the first OMS through to a second OMS. Step 1220 involves performing equalization on the second OMS with the pass through idle tone and any other idle tones added to channels of the system spectrum at the network element and information-carrying signals added to the system spectrum at the second network element or routed through the second network element. After power equalization is performed for all channels of the system spectrum, at step 1230 the insertion loss for the channel slot carrying the idle tone is determined for the network element bridging the two OMS and various optical elements of the second OMS, such as fiber-based optical amplifiers. Settings to control the output power of optical attenuators (OA) in the WSS component of the network element used for controlling the power leaving the network element and entering the second OMS may also be recorded for the equalized idle tone channel at step 1230. At step 1240, which can be considered an optional step, the pass through idle tone is replaced with a different idle tone or an information carrying signal When the channel is replaced by a different idle tone or an information-carrying signal in the second OMS, i.e. not the pass through idle tone, at step 1250, another optional step, the power of the different idle tone or the information-carrying signal can be controlled by setting optical attenuators in the network element based on the recorded equalized idle tone channel OA settings or the determined insertion loss for the idle tone channel, or both. This process results in the different idle tone or the information-carrying signal being optimized for the insertion loss of the second network element and various optical elements of the second OMS.

Numerous modifications and variations of the present application are possible in light of the above teachings. It is therefore to be understood that within the scope of the appended claims, the application may be practiced otherwise than as specifically described herein.

In addition, although described primarily in the context of methods, apparatus and equipment, other implementations are also contemplated, such as in the form of instructions stored on a non-transitory computer-readable medium, for example.

I claim:

1. A method for operating an optical multiplexed section (OMS) of a fiberoptic transmission link, the method comprising:
   propagating in the OMS a plurality of information-carrying signals each in a respective wavelength channel slot of the fiberoptic transmission link, wherein a number of the information-carrying signals is less than a total number of wavelength channel slots in the fiberoptic transmission link; and
   propagating in the OMS a plurality of idle tones in remaining wavelength channel slots not occupied by the information-carrying signals, so that all of the wavelength channel slots are occupied and wherein the idle tones occupy any of the wavelength channel slots not containing information-carrying signals.

2. The method of claim 1, further comprising replacing a first signal on a wavelength channel slot with a second signal on the wavelength channel slot.

3. The method of claim 2, wherein replacing a first signal with a second signal comprises one of:
   removing one of the information-carrying signals from the OMS and adding an idle tone in a wavelength channel slot of the information-carrying signal removed from the OMS;
   removing one of the idle tones from the OMS and adding another idle tone in a wavelength channel slot of the idle tone removed from the OMS; and
   removing one of the idle tones from the OMS and adding an information-carrying signal in a wavelength channel slot of the idle tone removed from the OMS.

4. The method of claim 3, wherein an optical power level of the second signal is substantially equal to an optical power level of the first signal before the removal.

5. The method of claim 1, further comprising generating the plurality of idle tones from amplified spontaneous emission (ASE) of an optical gain medium.

6. The method of claim 1, further comprising performing power equalization for all wavelength channel slots on the OMS section including the information-carrying signal wavelength channel slots and the wavelength channel slots carrying an idle tone.

7. The method of claim 1 further comprising:
collecting link information pertaining to the OMS and other OMS in an optical network of which the OMS and the other OMS are a part.

8. The method of claim 7, wherein the link information includes one or more of: link topology, span loss, optical amplifier gain for each of the at least one optical amplifier, noise figure, channel power, bit error rate (BER), polarization dependent loss (PDL), polarization mode dispersion (PMD), a filtering effect of a wavelength selective switch (WSS) in the OMS, and back-to-back performance of transponder.

9. The method of claim 2, wherein when replacing the first signal, the method further comprises:
determining an estimate of a performance margin for each wavelength channel;
determining an allowed gain offset;
determining a maximum number of wavelength channel slots of the at least one wavelength channel slot that can be replaced simultaneously based on at least one of the estimated performance margin, the allowed gain offset and a predetermined gain change mapping defining the gain for each wavelength channel slot when one or more wavelength channel slots are removed; and
for each wavelength channel slot of the determined maximum number of wavelength channel slots that can be replaced, replacing the first signal on the wavelength channel slot with the second signal.

10. The method of claim 9, wherein when the maximum number of wavelength channel slots that can be replaced simultaneously is more than one, replacing less than the maximum number of wavelength channel slots at a given time.

11. The method of claim 9, wherein for a replacement of multiple sub-carriers supporting multiple wavelength channel slots, replacing the multiple sub-carriers comprises:
replacing all of the multiple sub-carriers together simultaneously; or
replacing the sub-carriers in two or more sets of one or more sub-carriers.

12. The method of claim 9, wherein an optical path in a network includes multiple consecutive OMS sections, the method comprising performing for multiple OMS sections:
determining an estimate of a gain change for wavelength channel slots other than the wavelength channel slots being replaced if the wavelength channel slots being replaced were to be removed;
determining a maximum number of wavelength channel slots of the at least one wavelength channel slot that can be replaced simultaneously; and
for each of the determined maximum number of wavelength channel slots that can be replaced, replacing the first signal on the wavelength channel slot with the second signal.

13. The method of claim 1, further comprising using idle tones on wavelength channel slots for insertion loss calibration, wherein using the idle tones on the wavelength channel slots for insertion loss calibration comprises:
allowing the idle tones on the wavelength channel slots to pass through to a second OMS;
performing power equalization on the wavelength channel slots having the pass through idle tones;
recording at least one of insertion loss and optical attenuation settings for the wavelength channel slots having the equalized pass through idle tones.

14. An apparatus comprising:
a wavelength-selective switch (WSS) for receiving a plurality of information-carrying signals each in a respective wavelength channel slot of a fiberoptic transmission link, wherein a number of the information-carrying signals is less than a total number of wavelength channel slots in the fiberoptic transmission link, and for coupling the plurality of information-carrying signals to an optical multiplexed section (OMS); and
a light source coupled to the WSS to provide at least one idle tone in remaining wavelength channel slots not occupied by the information-carrying signals, so that all of the wavelength channel slots are occupied and wherein the at least one idle tone occupies any of the wavelength channel slots not containing information-carrying signals;
wherein the WSS is configured to couple the plurality of idle tones to the OMS.

15. The apparatus of claim 14, wherein the WSS is configured to replace a first signal on a wavelength channel slot with a second signal on the wavelength channel slot.

16. The apparatus of claim 15, wherein replacing the first signal with the second signal comprises one of:
removing one of the information-carrying signals from the OMS and adding an idle tone in a wavelength channel slot of the information-carrying signal removed from the OMS;
removing one of the idle tones from the OMS and adding another idle tone in a wavelength channel slot of the idle tone removed from the OMS; and
removing one of the idle tones from the OMS and adding an information-carrying signal in a wavelength channel slot of the idle tone removed from the OMS.

17. The apparatus of claim 15, wherein the WSS comprises variable optical attenuators configured to adjust an optical power level of the first signal and the second signal.

18. The apparatus of claim 14 further configured to perform power equalization for all wavelength channel slots on the OMS section including the wavelength channel slots bearing the plurality of information-carrying signals and the wavelength channel slots carrying the plurality of idle tones.

19. An apparatus comprising:
a processor; and
a computer readable medium for storing processor executable instructions, that when executed by the processor:
control propagation in an optical multiplexed section (OMS) in a fiberoptic transmission link of a plurality of information-carrying signals each in a respective wavelength channel slot of the fiberoptic transmission link, wherein a number of the information-carrying signals is less than a total number of wavelength channel slots in the fiberoptic transmission link; and
control propagation in the OMS of idle tones in remaining wavelength channel slots not occupied by the information-carrying signals, so that all of the wavelength channel slots are occupied and wherein the idle tones occupy any of the wavelength channel slots not containing information-carrying signals.

20. The apparatus of claim 19, wherein the computer readable medium has further stored thereon processor executable instructions, that when executed by the processor:
  collect link information pertaining to the OMS and other OMS in an optical network.

21. The apparatus of claim 19, wherein the link information includes one or more of: link topology, span loss, optical amplifier gain for each of the at least one optical amplifier, noise figure, channel power, bit error rate (BER), polarization dependent loss (PDL), polarization mode dispersion (PMD), a filtering effect of a wavelength selective switch (WSS) in the OMS, and back-to-back performance of transponder.

22. The apparatus of claim 19, wherein the computer readable medium has further stored thereon processor executable instructions, that when executed by the processor:
  replace a first signal on a wavelength channel slot with a second signal on the wavelength channel slot.

23. The apparatus of claim 22, wherein the computer readable medium has further stored thereon processor executable instructions, that when executed by the processor:
  determine an estimate of a performance margin for each wavelength channel;
  determine an allowed gain offset;
  determine a maximum number of wavelength channel slots of the at least one wavelength channel slot that can be replaced simultaneously based on at least one of the estimated performance margin, the allowed gain offset and a predetermined gain change mapping defining the gain for each wavelength channel slot when one or more wavelength channel slots are removed;
  for each wavelength channel slot of the determined maximum number of wavelength channel slots that can be replaced, send an indication to replace the first signal on the wavelength channel slot with the second signal.

24. The apparatus of claim 23, wherein determining the maximum number of wavelength channel slots that can be replaced simultaneously comprises determining the number of wavelength channel slots that can be replaced simultaneously such that the gain change for each of the wavelength channel slots other than the wavelength channel slots being replaced is less than a predetermined threshold.

25. The apparatus of claim 19 wherein the computer readable medium has further stored thereon processor executable instructions, that when executed by the processor:
  allow an idle tone on at least one wavelength channel slot to pass through to a second OMS;
  perform power equalization on wavelength channel slots having the pass through idle tones and information-carrying signals; and
  record at least one of insertion loss and optical attenuation settings for the at least one wavelength channel slot having the equalized pass through idler tone.

26. The apparatus of claim 25 wherein the computer readable medium has further stored thereon processor executable instructions, that when executed by the processor and when the pass through idle tone is removed from the wavelength channel slot and replaced with a different signal:
  adjust power of the channel from which the pass through idle tone was removed based on at least one of the recorded insertion loss and optical attenuation settings.

* * * * *